(12) United States Patent
Tokita

(10) Patent No.: US 6,559,995 B2
(45) Date of Patent: *May 6, 2003

(54) OPTICAL TRANSMISSION METHOD AND OPTICAL TRANSMITTER WITH TEMPERATURE COMPENSATION FUNCTION

(75) Inventor: Shigeru Tokita, Yokohama (JP)

(73) Assignee: OpNext Japan, Inc., Yokohama (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/101,467

(22) Filed: Mar. 20, 2002

(65) Prior Publication Data

US 2002/0126360 A1 Sep. 12, 2002

Related U.S. Application Data

(63) Continuation of application No. 09/258,946, filed on Mar. 1, 1999, now Pat. No. 6,362,910.

(30) Foreign Application Priority Data

Aug. 24, 1998 (JP) .............................................. 10-236791

(51) Int. Cl.[7] .......................... H04B 10/04; H04B 10/00
(52) U.S. Cl. ...................... 359/180; 359/154; 359/161
(58) Field of Search ............................. 359/180, 154, 359/161; 330/253; 372/34

(56) References Cited

U.S. PATENT DOCUMENTS

| | | | |
|---|---|---|---|
| 5,168,503 A | 12/1992 | Maeda | 372/21 |
| 5,646,774 A | 7/1997 | Takara et al. | 359/340 |
| 5,812,572 A * | 9/1998 | King et al. | 372/38.04 |
| 6,249,621 B1 | 6/2001 | Sargent et al. | 385/24 |
| 6,362,910 B1 * | 3/2002 | Tokita | 359/154 |

FOREIGN PATENT DOCUMENTS

| | | |
|---|---|---|
| JP | 2-215239 | 8/1990 |
| JP | 09-83456 | 3/1997 |
| JP | 10-229232 | 8/1998 |

* cited by examiner

*Primary Examiner*—Jason Chan
*Assistant Examiner*—Shi K. Li
(74) *Attorney, Agent, or Firm*—Kenyon & Kenyon

(57) ABSTRACT

An optical transmitter comprises a modulator for generating a modulated current in accordance with a modulation control signal, a light emitting element driven by the modulated current from the modulator to emit light in accordance with the modulated current, a first current source for supplying the modulator with a driving current, a first temperature detector for detecting an operating temperature of the modulator to output a signal indicative of a detected operating temperature of the modulator, and an amplifier for receiving a data signal to supply the modulator with the modulation control signal based on the data signal. The amplifier has a first modulation control signal controller for controlling a changing amount per unit time of the modulation control signal at rising and falling times in accordance with an output signal of the temperature detector.

12 Claims, 7 Drawing Sheets

FIG.1 *PRIOR ART*
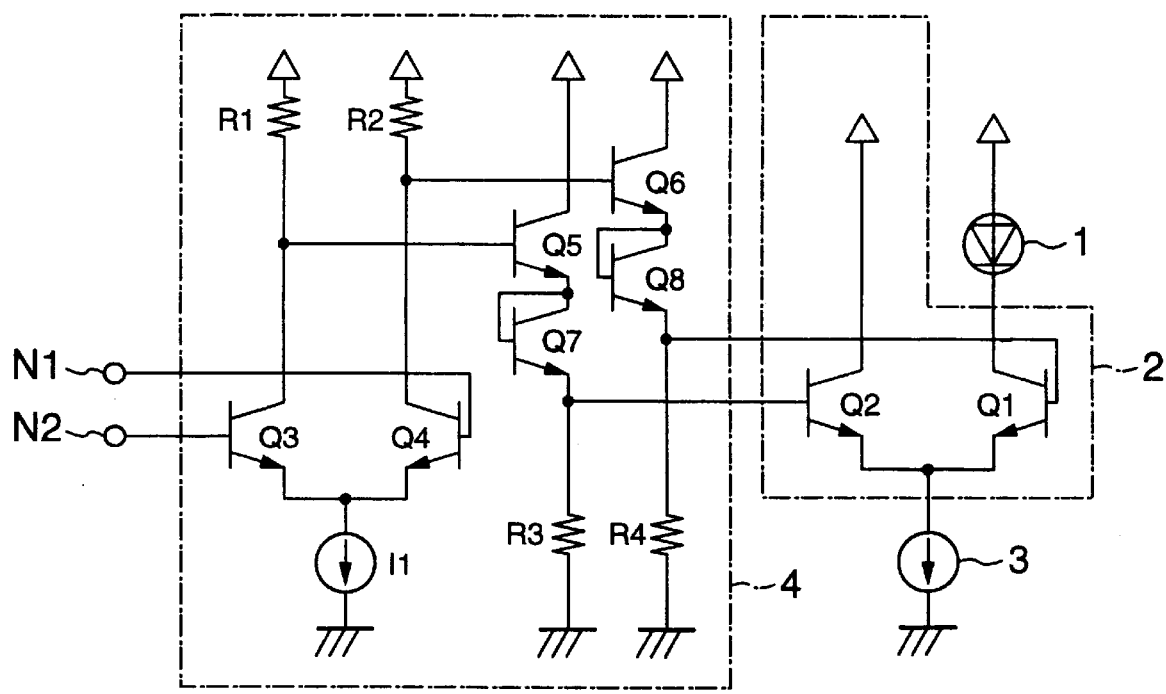
FIG.2 *PRIOR ART*
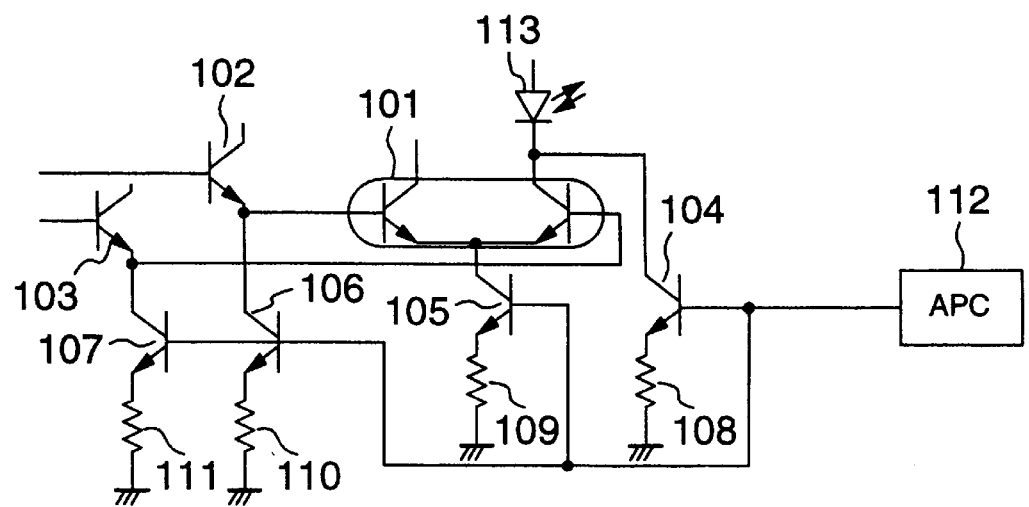

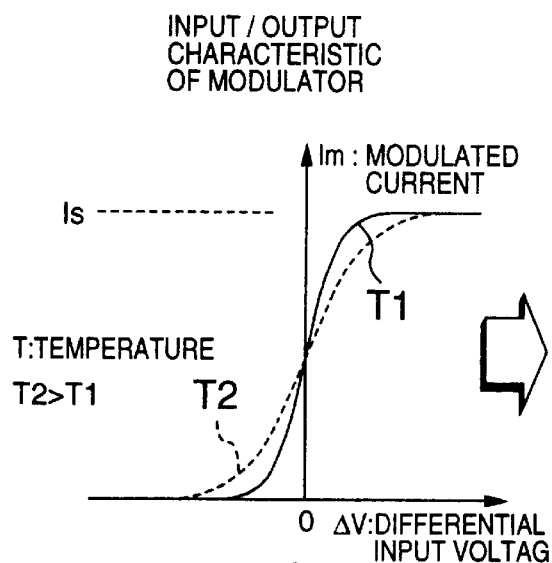
FIG. 3C
INPUT / OUTPUT CHARACTERISTIC OF MODULATOR
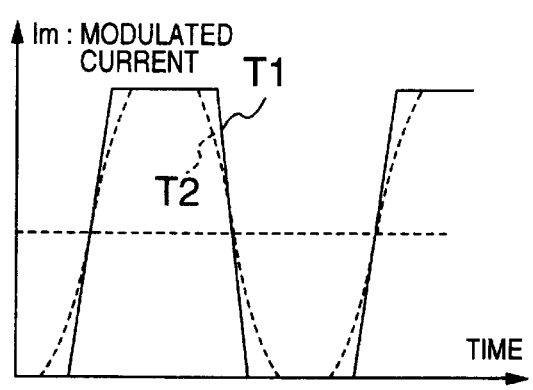
FIG. 3D
WAVEFORM OF MODULATED CURRENT SIGNAL
FIG. 3B
WAVEFORM OF MODULATION CONTROL SIGNAL
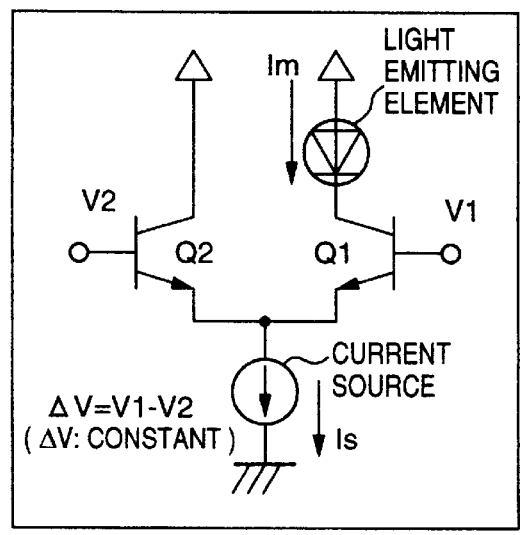
FIG. 3A

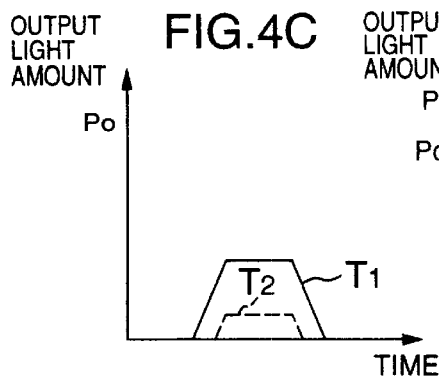
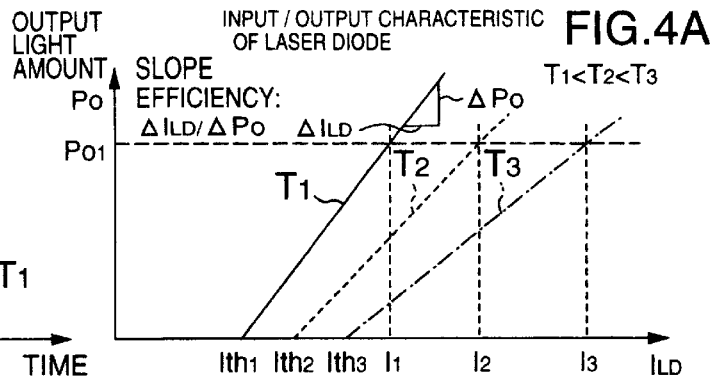
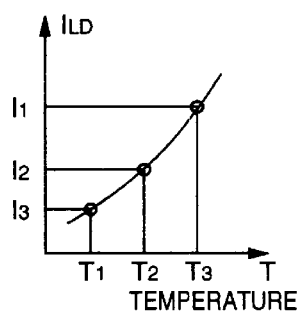
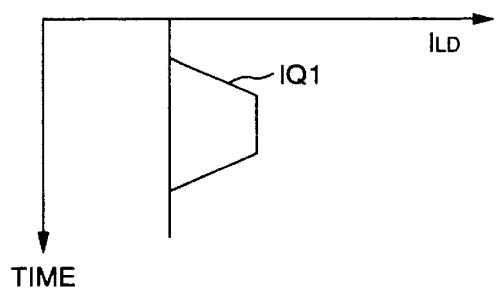
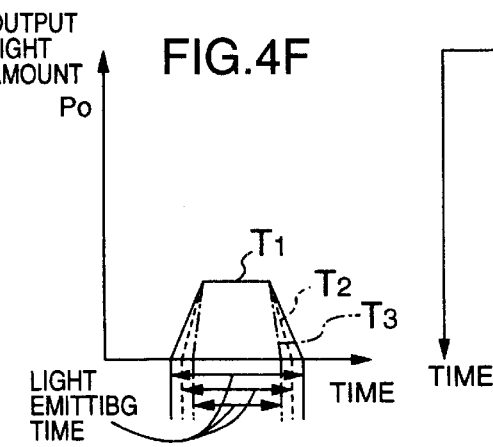
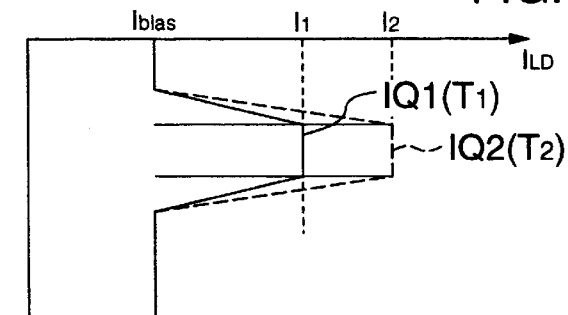
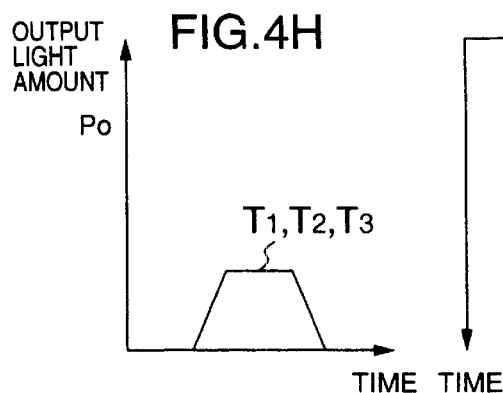
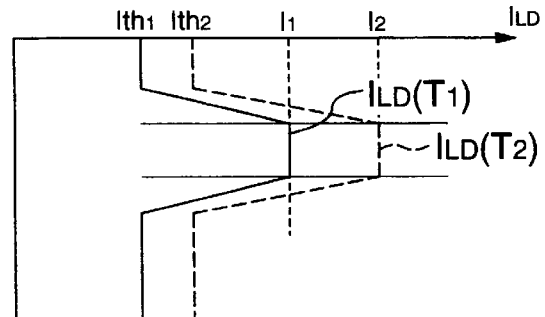

INPUT / OUTPUT CHARACTERISTIC OF MODULATOR

WAVEFORM OF MODULATED CURRENT SIGNAL

WAVEFORM OF MODULATION CONTROL SIGNAL

OPTICAL TRANSMISSION METHOD AND OPTICAL TRANSMITTER WITH TEMPERATURE COMPENSATION FUNCTION

This is a continuation of application Ser. No. 09/258,946 filed Mar. 1, 1999 U.S. Pat. No. 6,362,910.

BACKGROUND OF THE INVENTION

The present invention relates to an optical transmitter for transducing an electrical signal into an optical signal for transmission, and more particularly to an optical transmitter for stabilizing transition times (rising time and falling time) of an optical signal against a varying operating temperature. The present invention is also related to an optical transmission system using this optical transmitter.

An example of conventional optical transmitters is shown, for example, in JP-A-2-215239 (hereinafter called the "prior art (1)"). FIG. 1 illustrates the configuration of this optical transmitter.

The illustrated optical transmitter is composed of an amplifier 4, a modulator 2, a current source 3, and a light emitting element 1. Data signals of positive phase and negative phase are inputted to terminals N1, N2, respectively. The data signals are amplified by the amplifier 4 which is composed of transistors Q3–Q8, a current source I1, and resistors R1–R4, and inputted to bases of a pair of differential transistors Q1, Q2 in the modulator 2. The modulator 2 controls to conduct and break a driving current generated by the current source 3 in response to the signals inputted to bases of the transistors Q1, Q2. As a result, a modulated current signal is outputted to the light emitting device 1 connected to a collector of the transistor Q1, causing the light emitting device 1 to generate an optical signal.

Another example of conventional optical transmitters is shown, for example, in JP-A-10-229232 (hereinafter called the "prior art (2)"). FIG. 2 illustrates the configuration of this optical transmitter. The illustrated optical transmitter is composed of a pair of differential transistors 101 for supplying a semiconductor laser diode 113 with a modulated driving current; a transistor 104 for supplying the semiconductor laser diode or laser diode 113 with a bias current; and emitter follower transistors 102, 103 for driving the differential transistor pair 101, wherein a pulsed driving current for alternately driving the semiconductor laser diode 113 is controlled by an automatic power control (APC) voltage. More specifically, the APC voltage is used to control a current flowing through the emitter follower transistors 102, 103 for driving the differential transistor pair 101, so that even if the pulsed driving signal to the differential transistor pair 101 varies to cause fluctuations in the speed of the differential transistor pair 101, the speed of the emitter follower transistors 102, 103 can be changed to cancel a fluctuating portion of the speed of the differential transistor pair 101.

In addition, it has been known that as a base-to-collector voltage of a transistor forming part of a modulator in an optical transmitter changes due to a varying temperature, a parasitic capacitance between the base and the collector of the transistor also changes, thereby resulting in deformation of the optical signal waveform. To solve this problem, JP-A-9-83456 (hereinafter called the "prior art (3)") describes a technique for controlling a base voltage of the transistor in accordance with the temperature to compensate for a temperature dependency of the base-to-collector voltage of the transistor.

SUMMARY OF THE INVENTION

The optical transmitter according to the prior art (1), however, implies a problem that the optical signal rises and falls at different times depending upon the operating temperature. This problem results from the temperature characteristic of a bipolar transistor or a field effect transistor which forms part of the differential transistor pair of the modulator.

The following equations (1), (2) expresses the input/output characteristics (modulated current versus differential input voltage characteristics) of a modulator composed of bipolar transistors and a modulator composed of field effect transistors:

$$Im = \frac{Is}{1 + \exp\left(\frac{q \cdot \Delta V}{K_B \cdot T}\right)} \quad (1)$$

$$Im = \frac{1}{2}\left(Is + \frac{q \cdot D}{k_B \cdot T} \cdot \frac{W}{L} \cdot Co \cdot \Delta V \cdot \sqrt{\left(\frac{4Is}{\frac{q \cdot D}{k_B \cdot T} \cdot \frac{W}{L} \cdot Co}\right) - \Delta V^2}\right) \text{ where} \quad (2)$$

$$\Delta V < \sqrt{\frac{Is}{\frac{q \cdot D}{k_B \cdot T} \cdot \frac{W}{L} \cdot Co}} \quad (3)$$

Im is a modulated current; $\Delta V$, a differential input voltage; Is, a current source current; q, a charge; $k_B$, the Boltzmann's factor; T, an absolute temperature; W, a gate width; L, a gate length; Co, a gate capacitance per unit area; and D, a diffusion constant.

The equations (1), (2) respectively include a term "$\Delta V/T$." It can be seen that the input/output characteristic of the modulator varies depending on the operating temperature.

FIGS. 3A–3D are diagrams for explaining the temperature dependency of the waveform of a modulated current signal which is generated using a modulation control signal in a conventional optical transmitter. A modulator illustrated in FIG. 3A exhibits a reduced slope (a changing rate of the modulated current with respect to a change in a differential input voltage) of the input/output characteristic (a modulated current Im with respect to a differential input voltage: $\Delta V=V1-V2$; where V1, V2 are base voltages of transistors Q1, Q2) when the operating temperature rises from T1 K to T2 K, as illustrated in FIG. 3C. The reduced slope of the input/output characteristic in turn results in an extended linear input range for the differential input voltage.

The optical transmitter according to the prior art (1) supplies the modulator having the temperature characteristic as mentioned with an input signal of a constant voltage amplitude as illustrated in FIG. 3B irrespective of the operating temperature. On the other hand, rising/falling times of the modulated current signal Im is determined by a transition time of the modulation control signal in a linear input voltage range. Due to the temperature dependency of the modulated current signal Im, if the operating temperature changes from T1 to T2 to cause a change in the slope of the input/output characteristic, the rising/falling times of the modulated current signal change as illustrated in FIG. 3D, where a solid line and a dotted line represent the modulated current signal at temperatures T1 and T2, respectively. Therefore, an optical signal generated from the modulated current signal will have a temperature dependency in rising/falling times.

Further, a laser diode and a light emitting diode (LED), which are light emitting elements, have their input/output characteristics changing depending on the temperature. FIG. 4A is a graph illustrating the input/output characteristic of a laser diode. As illustrated in FIG. 4A, as an operating temperature increases from T1 to T2 and further to T3 (T1<T2<T3) in the laser diode, a threshold value for a driving current $I_{LD}$ for the laser diode to start emitting light also increases from Ith1 to Ith2 and Ith3. Also, as the operating temperature increases from T1 to T2 and further to T3, a slope efficiency ($\Delta Po/\Delta I_{LD}$), which is the slope of the input/output characteristic (driving current $I_{LD}$ versus output light amount Po), decreases as indicated by a solid line, a dotted line and a one-dot chain line.

Therefore, assuming that a collector current IQ1 of a transistor Q1, which serves as a driving current for a laser diode as illustrated in FIG. 4B, is constant irrespective of the output temperature, the output light amount Po of the laser diode will decrease as the temperature rises, as illustrated in FIG. 4C. In FIG. 4C, a waveform drawn by a solid line indicates the output light amount Po when the operating temperature is at T1, and a waveform drawn by a dotted line indicates the output amount Po when the operating temperature is at T2.

Similarly, when a light emitting diode is employed as a light emitting element, a slope efficiency ($\Delta Po/\Delta I_{LED}$), which is the slope of the input/output characteristic (driving current $I_{LED}$ versus output light amount Po), decreases as indicated by a solid line, a dotted line and a one-dot chain line as the operating temperature rises from T1 to T2 and T3, as illustrated in FIG. 5. Therefore, if the collector current IQ1 of the transistor Q1, which serves as a driving current for the light emitting diode, is constant irrespective of the operating temperature, the output light amount Po of the light emitting diode decreases as the operating temperature rises.

None of the prior arts (1), (2), (3) take into account a compensation for a change in the characteristic of the differential transistor pair due to the varying operating temperature or a compensation for a change in the characteristic of the light emitting element (laser diode) due to the varying operating temperature.

As described above, since the optical signal rises/falls at varying times depending on the operating temperature, the conventional optical transmitters have difficulties in generating a stable optical signal waveform over a wide range of operating temperature.

It is therefore an object of the present invention to provide an optical transmitter and an optical transmission system which eliminate the above-mentioned problems inherent to the prior art.

To achieve the above object, in one aspect of the present invention, there is provided an optical transmitter which comprises a modulator for generating a modulated current in accordance with a modulation control signal, a light emitting element driven by the modulated current from the modulator to emit light in accordance with the modulated current, a first current source for supplying the modulator with a driving current, a first temperature detector for detecting an operating temperature of the modulator to output a signal indicative of a detected operating temperature of the modulator, and an amplifier for receiving a data signal to supply the modulator with the modulation control signal based on the data signal, wherein the amplifier has a first modulation control signal controller for controlling a changing amount per unit time of the modulation control signal at rising and falling times in accordance with an output signal of said temperature detector.

In the optical transmitter configured as described above according to the present invention, the amplifier controls the slew rate of the modulation control signal to compensate for a temperature dependency of the input/output characteristic of the modulator. This result in substantially a constant transition time of the modulation control signal in a linear input voltage range of the modulator, thereby suppressing a temperature dependency of rising/falling times of the modulation control signal. Thus, an optical signal generated from the modulated current signal also has rising/falling times maintained substantially constant against the varying operating temperature.

Accordingly, the present invention can suppress the temperature dependency of the rising/falling times of the optical signal, thereby making it possible to provide an optical transmitter which exhibits a stable transition time over a wide range of temperature.

According to an example of the present invention, the optical transmitter further comprises a second temperature detector for detecting an operating temperature of the light emitting element to output a signal indicative of a detected operating temperature of the light emitting element, wherein the first current source controls the amount of driving current supplied to the modulator in accordance with an output signal of the second temperature detector. In this way, an output current of the first current source, which is a variable current source, is controlled in accordance with the operating temperature of the light emitting element, thereby compensating for a temperature dependency of a slope efficiency which is the slope of the input/output characteristic (driving current versus output light amount) of the light emitting element.

BRIEF DESCRIPTION OF THE DRAWINGS

FIG. 1 is a circuit diagram illustrating an example of conventional optical transmitters;

FIG. 2 is a circuit diagram illustrating another example of conventional optical transmitters;

FIG. 3A is a circuit diagram illustrating the configuration of a modulator and so on in an optical transmitter of FIG. 1;

FIG. 3B is a waveform chart of a modulation control signal in the modulator in FIG. 3A;

FIG. 3C is a graph illustrating the input/output characteristic of the modulator in FIG. 3A with respect to a varying temperature;

FIG. 3D is a waveform chart illustrating a change in a modulated current signal with respect to a varying temperature in the modulator in FIG. 3A;

FIG. 4A is a graph illustrating the input/output characteristic of a laser diode;

FIG. 4B is a graph illustrating the waveform of a driving current for a laser diode;

FIG. 4C is a graph illustrating the relationship between an operating temperature and an output light amount of a laser diode in the prior art;

FIG. 4D is a graph illustrating an example of a driving current waveform for a laser diode in an embodiment of an optical transmitter according to the present invention;

FIG. 4E is a graph illustrating the relationship between an operating temperature and a driving current for the laser diode in the embodiment of the optical transmitter according to the present invention;

FIGS. 4F and 4H are graphs illustrating the relationship between an operating temperature and an output light amount for the laser diode in the embodiment of the optical transmitter according to the present invention;

FIG. 4G is a graph illustrating another example of the waveform of a driving current for a laser diode in the embodiment of the optical transmitter according to the present invention;

DETAILED DESCRIPTION OF THE PREFERRED EMBODIMENTS

Figure 6:
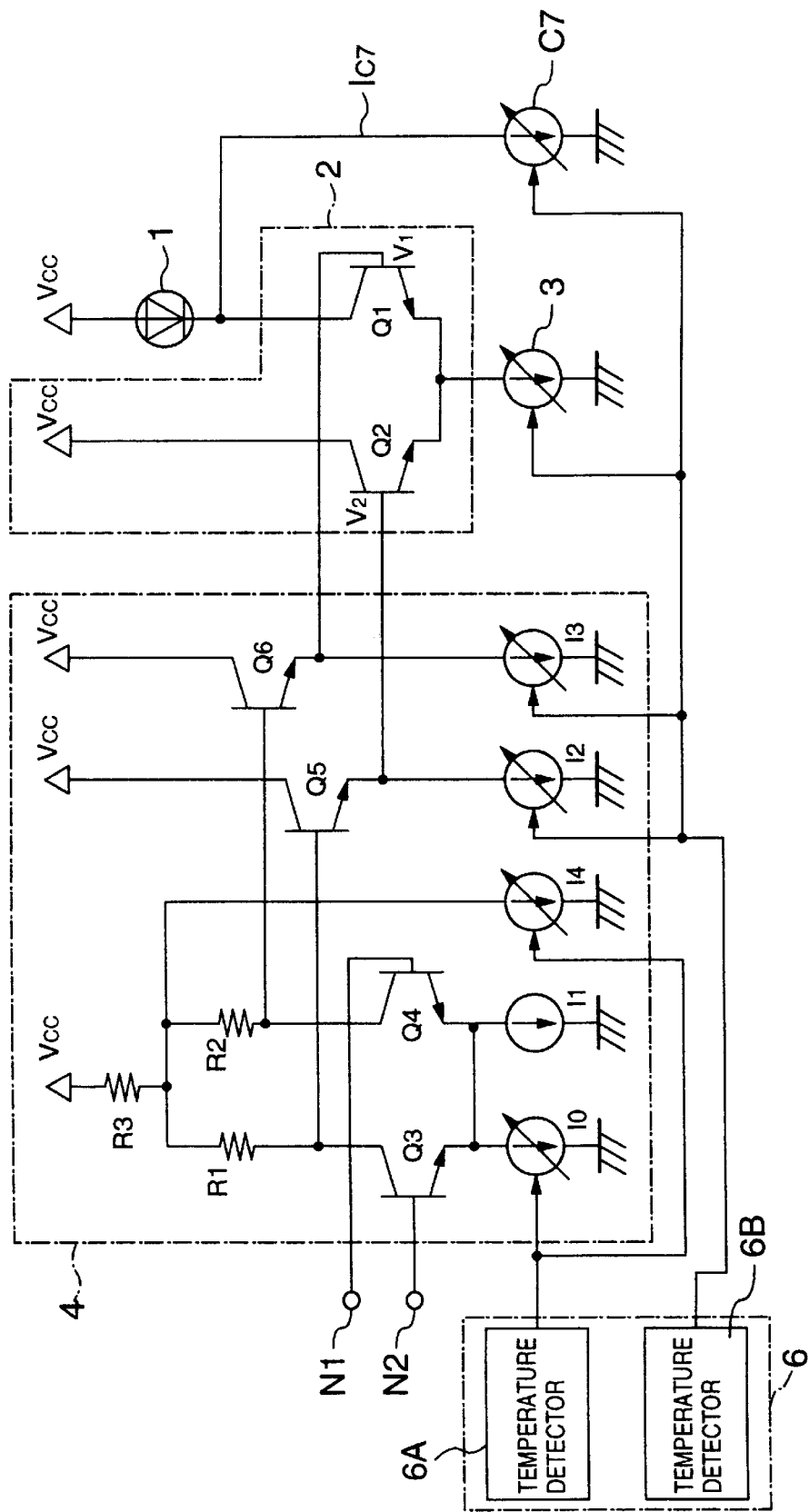
FIG. 6 is a circuit diagram illustrating an embodiment of an optical transmitter according to the present invention.

Embodiments of an optical transmitter according to the present invention will hereinafter be described with reference to the accompanying drawings. FIG. 6 is a circuit diagram illustrating an embodiment of an optical transmitter according to the present invention. The optical transmitter illustrated in FIG. 6 comprises an amplifier 4; a light emitting element 1 such as a laser diode, LED or the like; a modulator 2; a current source 3 for the modulator 2; a current source C7 for the light emitting element 1; and temperature detectors 6 (6A, 6B). Input terminals IN1, IN2 receive data signals of positive phase and negative phase, respectively, from the outside of the optical transmitter.

The amplifier 6 comprises pairs of differential transistors Q3, Q4 and Q5, Q6, and functions to amplify the inputted data signals and shift the levels of the same. The transistors Q3, Q4 have their bases connected to the terminals N2, N1, respectively, and their emitters grounded through a variable current source I0 and a current source I1, respectively. The transistor Q3 has a collector connected to a voltage source Vcc through resistors R1, R3, as well as to a base of the transistor Q5. The transistor Q4 has a collector connected to the voltage source Vcc through resistors R2, R3 as well as to a base of the transistor Q6. A connection point of the resistors R1, R2 is connected to a variable current source I4. The transistors Q5, Q6 have their emitters connected to variable current sources I2, I3 as well as to the modulator 2. Emitter voltages V2, V1 of the transistors Q5, Q6 are supplied to the modulator 2 as differential input voltages (modulation control signal).

The modulator 2 has a pair of differential transistors Q1, Q2, and conducts/breaks a driving current from the current source 3 in response to an output signal from the amplifier 4 to generate a modulated signal to a collector of the transistor Q1. The transistors Q1, Q2 have their bases connected to the emitters of the transistors Q5, Q6, respectively, and have their emitters connected to the variable current source 3. The transistor Q2 has a collector connected to the voltage source Vcc, while the transistor Q1 has a collector connected to the light emitting element 1 as well as to a variable current source C7. A modulated signal (modulated current signal) Im from the modulator 2 is supplied to the light emitting element 1 to force the same to emit light in accordance with the modulated signal, thereby generating an optical signal.

The temperature detector 6A measures an operating temperature of the modulator 2, and generates an output voltage corresponding to the measured temperature which is supplied to the variable current sources I0, I4, respectively. In this way, the optical transmitter is compensated for a change in the input/output characteristic of the differential transistor pair in the modulator 2 due to the varying operating temperature, as will be described below in greater detail.

The temperature detector 6B measures an operating temperature of the light emitting element 1, and generates an output voltage corresponding to the measured temperature which is supplied to the variable current sources I2, I3, 3, C7. In this way, the optical transmitter is compensated for a change in the input/output characteristic of the light emitting element 1 due to the varying operating temperature, as will be described below in greater detail.

First explained is a compensation for a change in the input/output characteristic of the differential transistor pair in the modulator 2 due to the varying operating temperature.

Figure 8C:
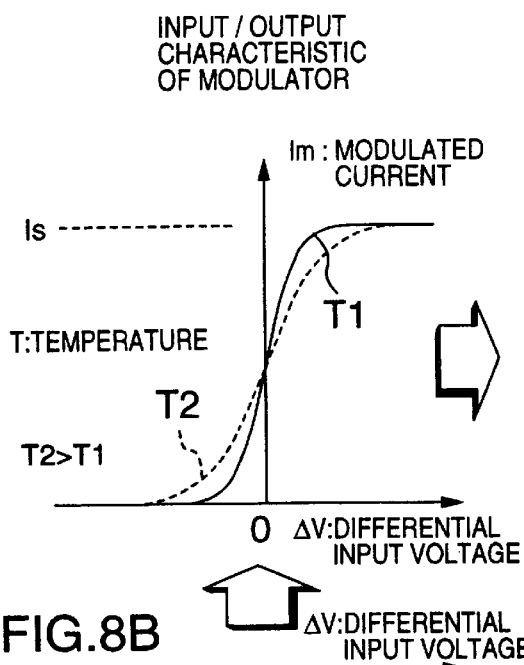
FIG. 8C is a graph illustrating the input/output characteristic with respect to a varying temperature of the modulator in FIG. 8A.
Figure 8D:
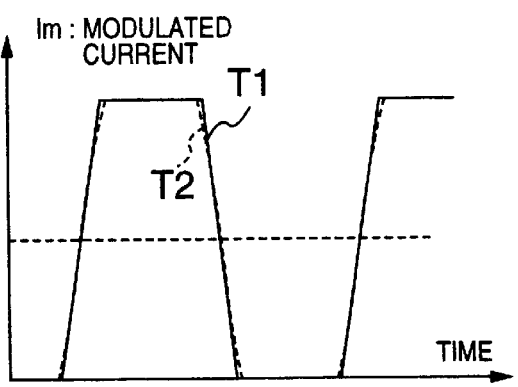
FIG. 8D is a waveform chart illustrating a modulated current signal with respect to a varying temperature in the modulator in FIG. 8A.
Figure 8B:
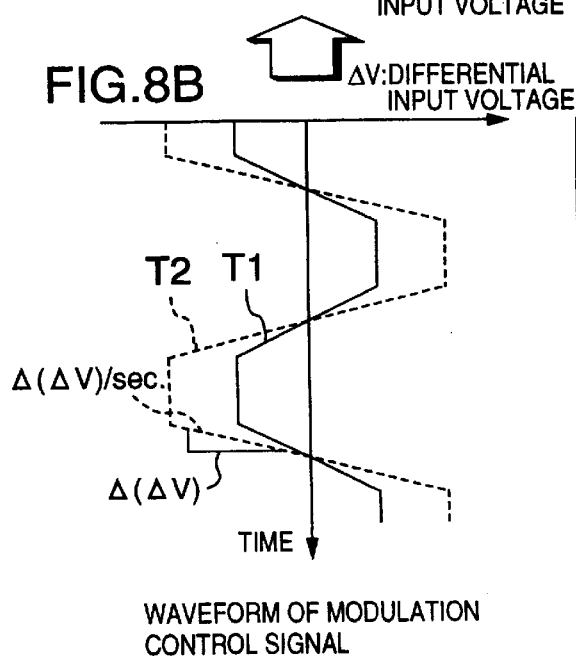
FIG. 8B is a waveform chart of a modulation control signal in the modulator in FIG. 8A.
Figure 8A:
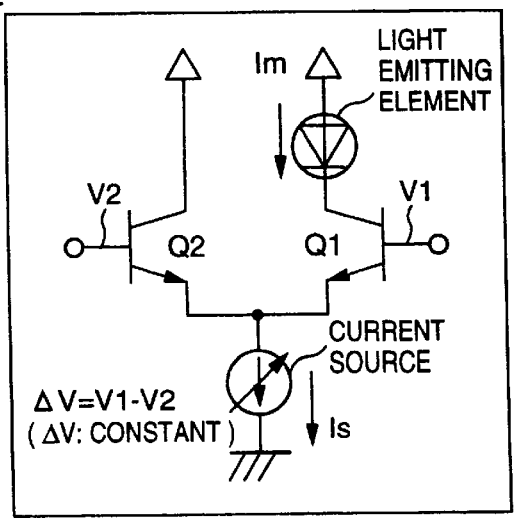
FIG. 8A is a circuit diagram illustrating the configuration of a modulator and so on in the optical transmitter of FIG. 6.

As previously explained with reference to FIG. 3C, the slope (a changing rate $\Delta Im/\Delta(\Delta V)$ of the modulated current with respect to a change in a differential input voltage) of the input/output characteristic (the modulated current Im characteristics with respect to the differential input voltage ($\Delta V=V1-V2$)) of the modulator 2 illustrated in FIG. 8A decreases as the operating temperature of the modulator rises, as illustrated in FIG. 8C. Therefore, in this embodiment, the voltage amplitude of the modulation control signal (the differential input voltage $\Delta V$) is made temperature dependent to compensate for a temperature dependency of the input/output characteristic of the modulator 2. In other words, as a detected temperature provided by the temperature detector 6A rises, the voltage amplitude of the modulation control signal (differential input voltage $\Delta V$) is increased to consequently provide a greater slope for the differential input voltage $\Delta V$, i.e., to increase a voltage changing amount of the differential input voltage $\Delta V$ per unit time ($\Delta(\Delta V)$/sec, slew rate) at rising and falling times. More specifically, as illustrated in FIG. 8B, when the temperature detected by the temperature detector 6A rises from T1 to T2, the voltage amplitude of the modulation control signal (differential input voltage $\Delta V$) is increased from a level indicated by a solid line to a level indicated by a dotted line, consequently increasing a voltage changing amount of the differential input voltage $\Delta V$ per unit time at rising and falling times (slew rate). As a result, even if the input/output characteristic of the modulator 2 has a temperature dependency as illustrated in FIG. 8C, the modulator 2 generates the modulated current signal of a constant waveform irrespective of the operating temperature, as illustrated in FIG. 8D, thereby making it possible to suppress the temperature dependency of the modulated current signal at the rising and falling times. In FIG. 8D, waveforms drawn in a solid line and a dotted line indicate the waveforms of the modulated current signal when the operating temperature of the modulator 2 is at T1 and T2, respectively.

In accordance with the explanation set forth above, this embodiment sets an output current of the variable current source I0 to increase as the temperature detected by the temperature detector 6A rises.

Figure 5:
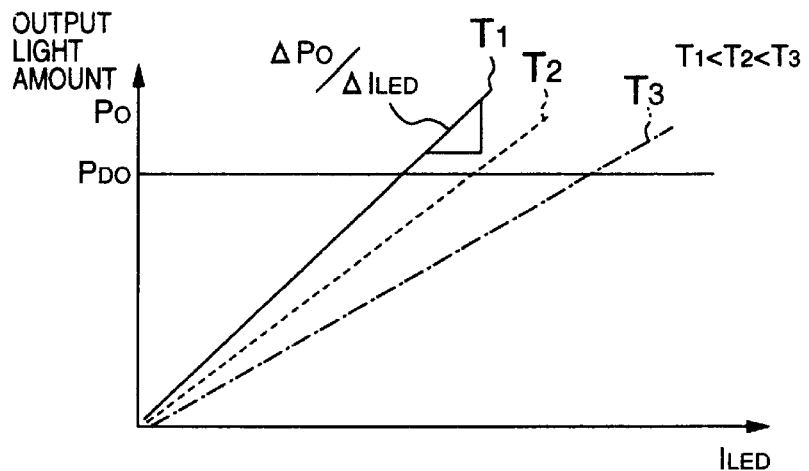
FIG. 5 is a graph illustrating the input/output characteristic of a light emitting diode.
Figure 7A:
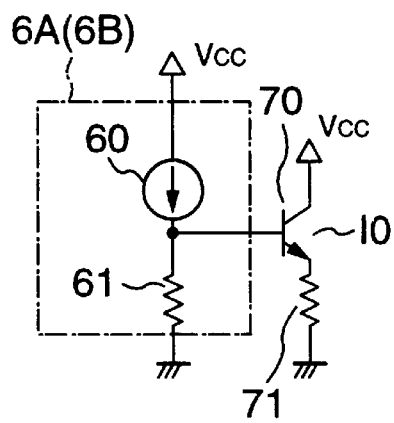
FIGS. 7A and 7B are circuit diagrams each illustrating an exemplary configuration of a temperature detector shown in FIG. 6.

FIG. 7A is a circuit diagram illustrating an example of the temperature detector 6A and a variable current source. The temperature detector 6A may be a series connection of a temperature sensitive resistive element having a positive temperature coefficient, for example, a thermistor 61 and a current source 60. An output voltage from a connection point of the two components is supplied to the variable current source.

The variable current source (for example, I0) is composed, for example, of a bipolar transistor 70 and a resistor connected to an emitter of the bipolar transistor 70 as illustrated in FIG. 7A. The transistor 70 is applied at its base with an output voltage of the thermistor 61 (output voltage of the temperature detector 6A). It should be noted that the variable current source may be formed of a field effect transistor (FET) instead of a bipolar transistor, in which case the output voltage of the temperature detector 6A is applied to a gate electrode of the FET.

Therefore, as a temperature sensitive resistive element, for example, the thermistor 61, selection may be made to such one that has the resistance which increases as the operating temperature of the modulator rises to change the voltage amplitude of the modulation control signal (differential input voltage ΔV) in accordance with the operating temperature as illustrated in FIG. 8B.

Figure 7B:
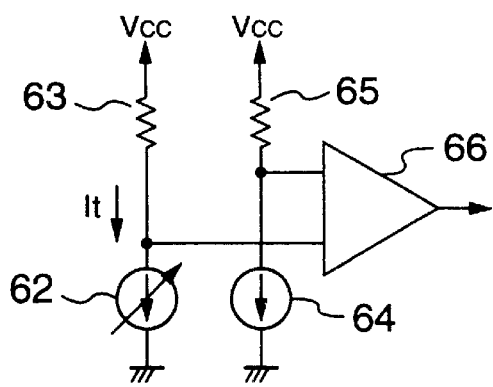
Figure 7C:
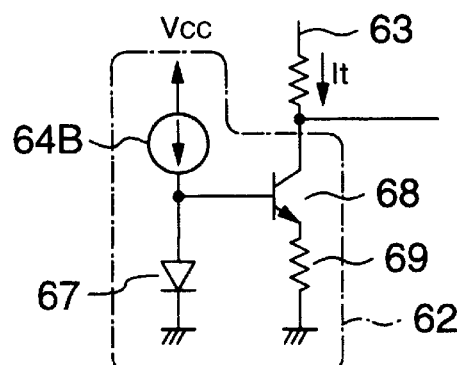
FIG. 7C is a circuit diagram illustrating an exemplary configuration of a current source in FIG. 7B.

FIG. 7B is a circuit diagram illustrating another exemplary configuration of the temperature detector 6A, and FIG. 7C is a circuit diagram illustrating an exemplary configuration of the current source in FIG. 7B. Referring first to FIG. 7B, the temperature detector 6A comprises a first series connection of a current source 62 and a resistor 63; a second series connection of a current source 64 and a resistor 65; and a differential amplifier 66 which receives an output at a connection point of the current source 62 and the resistor 63 and an output at a connection point of the current source 64 and the resistor 65. The differential amplifier 66 may additionally have a level shift circuit for adjusting its output level. The current source 62 comprises a series connection of a current source 64B and a diode 67; a transistor 68 having a base connected to an anode of the diode 67; and a resistor 69 connected to an emitter of the transistor 68, and a collector output of the transistor 68 serves as the output of the current source. Since the current source 62 exhibits an anode voltage varying due to the temperature dependency of the diode 67 and the transistor 68, the output voltage of the current source also varies depending upon the temperature. Consequently, the output voltage of the differential amplifier 66 in FIG. 7B also varies depending on the temperature. To compensate for the temperature dependent output voltage of the differential amplifier 66, the resistors 63, 65, 69 may be adjusted such that the output voltage of the differential amplifier 66 has a characteristic such that it increases as the operating temperature of the modulator rises to change the voltage amplitude of the modulation control signal (differential input voltage ΔV) in accordance with the operating temperature as illustrated in FIG. 8B.

In this way, the variable current source I0 and the transistors Q3–Q6 function as a first modulation control signal controller for controlling a voltage change amount (slew rate) per unit time of the modulation control signal at rising and falling times.

While this embodiment gives the temperature dependency to the voltage amplitude to indirectly apply the temperature dependency to the slew rate, the temperature dependency may be given only to the slew rate without changing the voltage amplitude. For example, in the foregoing configuration, a limiter circuit for shaping the amplitude of the modulation control signal to a constant level may be further provided between the amplifier 4 and the modulator 2, in which case it is also possible to suppress the temperature dependency of the modulated current signal at rising and falling times.

Further, in this embodiment, the output of the temperature detector 6A is connected to the variable current source I4.

The current source I4 connected to the temperature detector 6A functions to change a direct current (DC) level of the output signal from the amplifier 4. As mentioned above, it has been known that as the base-to-collector voltage of the transistor Q1 forming part of the modulator 2 varies, this causes a parasitic capacitance between the base and the collector of the transistor Q1 to vary to consequently change the waveform of the optical signal. Particularly, when the light emitting element 1 such as a laser diode, a light emitting diode or the like is connected to the modulator 2, a collector potential of the transistor Q1 changes due to fluctuations of a forward voltage of the light emitting element 1 in accordance with a varying temperature. Therefore, if the DC level of the input signal to the modulator 2 is made constant, the base-to-collector voltage of the transistor Q1 fluctuates in accordance with the operating temperature, thus causing a change in the parasitic capacitance. To avoid this inconvenience, this embodiment gives a temperature dependency to the current source I4 to change the DC level of the output signal from the amplifier 4 in accordance with the operating temperature of the modulator 2. Therefore, even if the forward voltage of the light emitting element 1 changes, the base-to-collector voltage of the transistor Q1 is controlled to be substantially constant, thereby making it possible to suppress the temperature dependency of the parasitic capacitance.

More specifically, when an elevated temperature causes the driving current to increase to consequently increase the forward voltage of the light emitting element 1, the output voltage of the temperature detector 6A is increased to increase the current from the variable current source I4, and as a result, emitter voltages of the transistors Q5, Q6, i.e., base voltages V1, V2 of the transistors Q1, Q2 of the modulator 2 increase. Thus, the base-to-collector voltage of the transistor Q1 is maintained constant irrespective of a varying temperature.

As described above, the variable current source I4 and the transistors Q5, Q6 function as a second modulation control signal controller for maintaining the DC level of the modulation control signal constant irrespective of a varying operating temperature of the modulator 2.

Next explained is a compensation for a change in the input/output characteristic of the light emitting element 1 due to the varying operating temperature. As previously described with reference to FIG. 4A, a laser diode or a light emitting diode (LED), which may be used as the light emitting element 1, exhibits the input/output characteristic that changes depending on the temperature.

In this embodiment, to compensate for the temperature dependency of the slope efficiency ($\Delta Po/\Delta I_{LD}$) of the light emitting element 1 (for example, a laser diode), which is the slope of the input/output characteristic of the light emitting element 1 (driving current $I_{LD}$ versus output light amount Po), the optical transmitter is controlled to increase the output current of the variable current source 3 in accordance with an increase in the output voltage of the temperature detector 6B which detects the operating temperature of the light emitting element 1 (i.e., a rise in the operating temperature). The temperature detector 6B may have a similar configuration to that of the temperature detector 6A.

More specifically, for maintaining an output light amount Po of the light emitting element 1 (for example, a laser diode) at a fixed value Po1 irrespective of a varying temperature, the driving current (modulated current) $I_{LD}$ must be increased from I1 to I2 and further to I3 as the temperature rises from T1 to T2 and further to T3. To realize this increase, when the operating temperature of the light emitting element 1 rises from T1 to T2, the output current of the variable current source 3 is increased in accordance with an increase in the output voltage of the temperature detector 6B to cause a collector current of the transistor Q1 to increase from IQ1(T1) (peak value=I1) to $I_{Q2(T2)}$ (peak value=I2), as illustrated in FIG. 4D. In this way, the output light amount Po of the light emitting element 1 is maintained at the fixed value Po1 irrespective of a varying temperature, as illustrated in FIG. 4F.

On the other hand, as illustrated in FIG. 4A, the slope efficiency ($\Delta Po/\Delta I_{LD}$), which is the slope of the input/output characteristic (driving current $I_{LD}$ versus output light amount Po), decreases as indicated by a solid line, a dotted line and a one-dot chain line as the operating temperature rises from T1 to T2 and further to T3. Thus, as illustrated in FIG. 4D, when the collector current $I_{Q1}$ is increased from $I_{Q1(T1)}$ to $I_{Q2(T2)}$ as the operating temperature rises from T1 to T2, the slope of the waveform of the collector current $I_{Q1}$ is increased at the rising and falling times, thereby making it possible to compensate for a decrease in the slope efficiency due to a rise in the operating temperature.

Such an adjustment may be achieved by selecting an appropriate characteristic of the thermistor illustrated in FIG. 7A if it is used as the temperature detector 6B, or by adjusting the resistors 63, 65 or the like if the configuration illustrated in FIG. 7B is used.

As described above, this embodiment can suppress fluctuations in the output light amount (power) of the optical signal due to a varying operating temperature of the light emitting element.

In the laser diode, as the operating temperature rises from T1 to T2 and further to T3 (T1<T2<T3), the threshold value for the driving current $I_{LD}$ for the laser diode to start emitting light correspondingly increases from Ith1 to Ith2 and further to Ith3, as illustrated in FIG. 4A. Therefore, if a DC level Ibias of the collector current $I_{Q1}$ ($I_{Q1(T1)}$, $I_{Q2(T2)}$) of the transistor Q1 remains constant irrespective of a varying temperature as illustrated in FIG. 4B, a light emitting time is reduced as the operating temperature rises, as illustrated in FIG. 4F, because the threshold current has a temperature dependency.

Thus, for maintaining the light emitting time constant irrespective of a varying temperature, a variable current source C7 is connected between the laser diode 1 and the collector of the transistor Q1 as illustrated in FIG. 6, to increase an output current from the variable current source C7 as the output voltage of the temperature detector 6B increases. Thus, the DC level (bias level) of the current $I_{LD}$ flowing through the laser diode 1 increases as the operating temperature of the laser diode rises, as illustrated in FIG. 4G. In other words, as the operating temperature rises from T1 to T2 and further to T3, the DC level of the current $I_{LD}$ flowing through the laser diode is also increased from Ith1 to Ith2 and Ith3. In this way, the light emitting time can be made constant irrespective of a varying temperature, as illustrated in FIG. 4H.

Such an adjustment may be achieved by selecting an appropriate characteristic for the thermistor illustrated in FIG. 7A, if it is used as the temperature detector 6B, or by adjusting the resistors 64, 65 or the like when the configuration illustrated in FIG. 7B is used.

When an LED is used as the light emitting element 1, the value for a driving current for the LED to start emitting light is very small or zero, so that the variable current source C7 is not required.

Further, when a laser diode is used as the light emitting element 1 also in this embodiment, the variable current source C7 may be provided such that its output current is controlled in response to the output of the temperature detector 6B in a manner similar to the embodiment of FIG. 6. Alternatively, the output current of the variable current source C7 may be controlled in response to the output of a light output control circuit 10 instead of the output of the temperature detector 6B.

Base currents $I_{1b}$, $I_{2b}$ of the transistors Q1, Q2 are generated alternately in association with a current switching operation of the modulator 2. The base currents $I_{1b}$, $I_{2b}$ flow through the emitter follower transistors Q5, Q6 to cause fluctuations in base-to-emitter voltages of these transistors Q5, Q6. As a result, the base-to-emitter voltages of Q5, Q6 end up to be asymmetric. Further, when the output current value of the variable current source 3 changes depending on the temperature, the base currents $I_{1b}$, $I_{2b}$ are inevitably proportional to this output current value.

To solve this problem, this embodiment sets the variable current sources I2, I3 for the emitter follower transistors Q5, Q6 at an output stage of the amplifier 4 to values sufficiently larger than $I_{1b}$, $I_{2b}$, and controls the input/output characteristics of I2, I3 depending on the output voltage of the temperature detector 6B, in order to suppress the asymmetry of the base-to-emitter voltages of the emitter follower transistors. More specifically, as the output current value of the variable current source 3 increases as the temperature rises, the output currents of the variable current sources I2, I3 are increased in accordance with an increase in the output voltage of the temperature detector 6B, thereby making it possible to maintain the ratio of $I2/I_{b1}$, $I3/I_{b2}$ at or above a predetermined value (for example, in a range of 5 to 10) even if the output current value of the variable current source 3 changes depending on the temperature. In this way, the asymmetry of the base-to-emitter voltages of Q5, Q6 is suppressed independently of the output current value of the variable current source 3. Therefore, the modulator 2 provides a stable modulation operation (current switching characteristic) in a wide range of operating temperature.

Such an adjustment may be achieved by selecting an appropriate characteristic of the thermistor illustrated in FIG. 7A, if it is used as the temperature detector 6B, or by adjusting the resistors 63, 65 or the like when the configuration illustrated in FIG. 7B is used.

As described above, the variable current sources I2, I3 and the transistors Q5, Q6 function as a third modulation control signal controller for controlling the current at the output stage of the amplifier to control the current of the modulation control signal.

While the foregoing embodiment comprises the temperature detectors 6A, 6B separately for measuring the operating temperature of the modulator 2 and the light emitting element 1, either one of the temperature detectors 6A, 6B may only be used (for example, the temperature detector 6A). In this case, the variable current sources I0, I4 may be directly supplied with the output of the temperature detector 6A. On the other hand, the other variable current sources I2, I3, 3, C7 are supplied with the output voltage of the temperature detector 6A through an adjuster for adjusting the output voltage.

With the features described above, the optical transmitter according to this embodiment realizes a stable optical transmission characteristic since its optical signal power and optical signal waveform are hardly affected by a varying temperature.

Next, another embodiment of the optical transmitter according to the present invention will be described with reference to FIG. 9. Components in FIG. 9 having similar functions to those in the embodiment of FIG. 6 are designated the same reference numerals, and description thereon is omitted.

The illustrated optical transmitter is composed of a waveform shaping circuit, for example, a flip-flop circuit 3; a light emitting element 1; temperature detector circuits 6 (6A, 6B); and an automatic power control (APC) circuit. Input terminals N3, N4 receive a data signal and a clock signal, respectively. The flip-flop circuit 8 fetches the data signal in synchronism with the clock signal to shape the waveform of the data signal, and for example, generates a pulsed data signal having a duty ratio of 50%.

In this embodiment, a bias current source C7 is controlled by an output signal of a light output power control circuit 10. For this reason, a threshold current for a laser diode is not controlled to be equal to a bias current (normally, the threshold current is set to be larger than the bias current). Therefore, the pulse width of the optical waveform is smaller than the pulse width of a modulated current signal. A pulse width control circuit 7 is therefore provided to increase the former larger than the latter. The pulse width control circuit 7 corrects the duty ratio of the output signal from the flip-flop circuit 8 in response to the output of the temperature detector 6A or 6B (the outputs of the respective temperature detectors 6A, 6B when the temperature of the pulse width control circuit 7 is substantially equal to the operating temperature of the modulator 2 and the light emitting element 1), and supplies the output signal with the corrected duty ratio to the amplifier 4. In other words, the pulse width control circuit fits the output signal of the flip-flop circuit 8 in accordance with the temperature characteristic of "threshold current-bias current." The amplifier 4 controls the amplitude of the output signal from the pulse width control circuit 7 in response to the outputs of the temperature detectors 6A, 6B in a manner similar to the embodiment of FIG. 6.

As a result of giving a temperature dependency to the amplitude of the output voltage from the amplifier 4 as mentioned, a temperature dependency is also given to the slew rate (Δ(ΔV)/sec) which represents a voltage changing amount per unit time of the modulation control signal in the modulator 2 at rising and falling times. The configuration described above suppresses the temperature dependencies of the duty ratio and the rising and falling times of an optical signal generated by the light emitting element 1.

Figure 9:
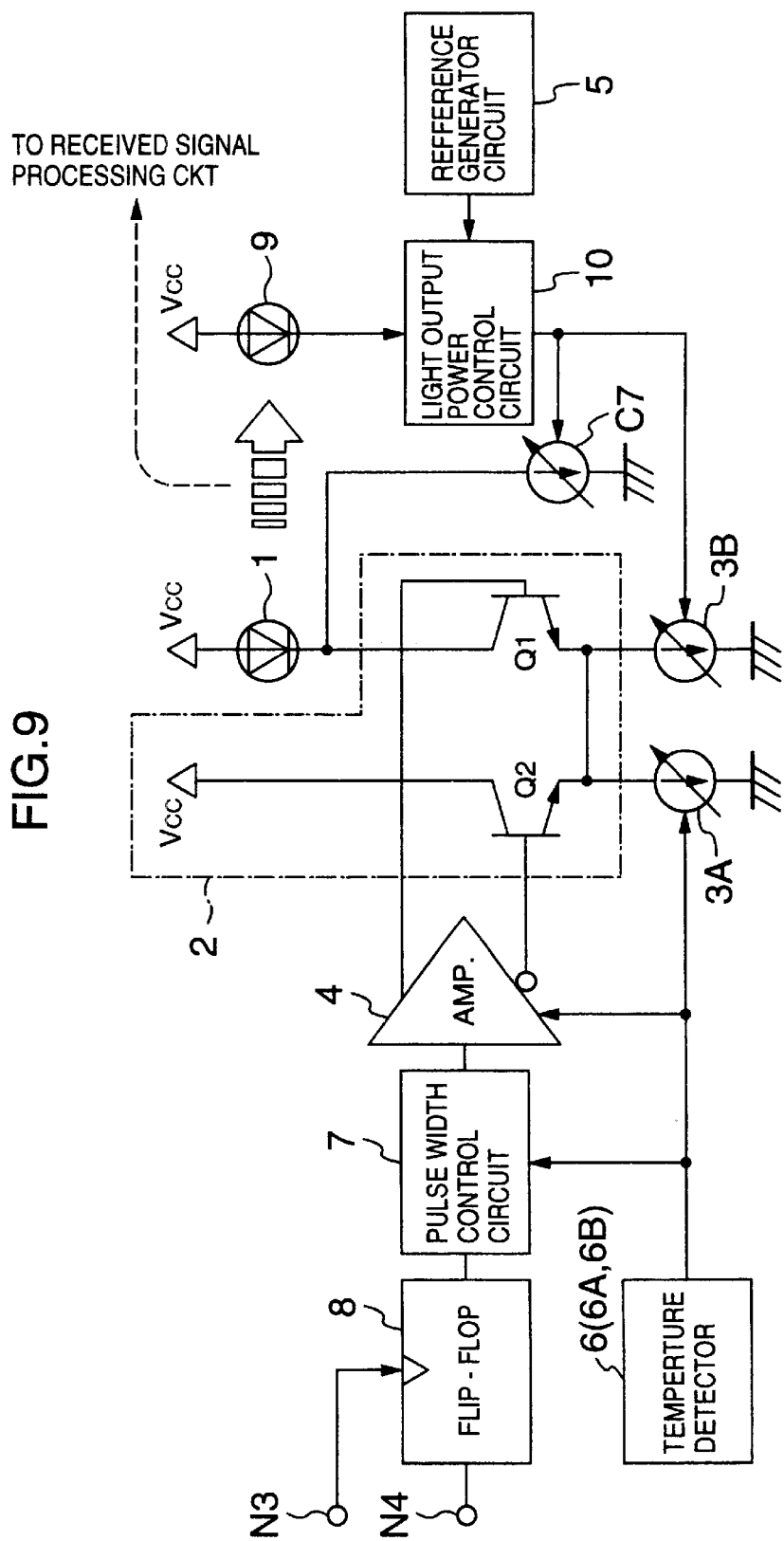
FIG. 9 is a circuit diagram illustrating another embodiment of the optical transmitter according to the present invention.

Unlike the embodiment illustrated in FIG. 6, the modulator 2 in FIG. 9 is configured such that the transistors Q1, Q2 have their emitters commonly connected to each other, and also connected to the variable current sources 3A, 3B, respectively. The variable current source 3A is connected to the temperature detector 6B to compensate for the temperature characteristic of the input/output characteristic (slope efficiency) of the light emitting element 1 in response to the output of the temperature detector 6B. It is therefore understood that the variable current source 3A has a function similar to the variable current source 3 in the embodiment of FIG. 6.

The variable current source 3B, the light emitting element 1, a light receiving element 9 such as a photodiode, a reference generator circuit 5, and a light output power control circuit 10 constitute an automatic power control (APC) circuit which forms a negative feedback loop. The light receiving element 9 monitors the amount of received light in an optical signal from the light emitting element 1, and supplies the light output power control circuit 10 with an electrical signal indicative of the amount of received light. The light output power control circuit 10 compares the amplitude level of the electrical signal from the light receiving element 9 with a reference level from the reference generator circuit 5 to calculate a difference therebetween, and supplies the variable current source 3B with a control signal for reducing the difference to zero to control the output current of the variable current source 3B. In this way, the light emitting element 1 is controlled to maintain a constant amount of output light. Alternatively, the light output power control circuit 10 may calculate an average amplitude level of the electrical signal from the light receiving element 9, and compares the average amplitude level with the reference level from the reference generator circuit 5 to derive a difference therebetween. The APC circuit as mentioned is used to compensate for aging changes (deterioration) in the input/output characteristic (slope efficiency) of the light emitting element 1.

Also, in FIG. 9, a portion of the light output signal from the light emitting element 1 is supplied to a received signal processing circuit (not shown) for demodulation. An optical transmission system is constituted by the optical transmitter and an optical receiver.

Alternatively, the variable current sources 3A, 3B may be replaced with a common variable current source such that an output current of the variable current source is controlled with the output of the temperature detector 6B and the output of the light control circuit 10.

Since this embodiment suppresses the temperature dependencies of the duty ratio and rising/falling times of the waveform of the optical signal, and also compensates for the temperature dependency and aging deterioration of the slope efficiency of the light emitting element 1, a stable optical power can be provided.

A variety of the optical transmitters described above may constitute an optical transmission system in combination of an optical receiver, not shown. With the use of any optical transmitter described above, an optical signal outputted from the optical transmitter has suppressed fluctuations in optical power and rising/falling times over a wide range of temperature. Since the optical signal with a suppressed temperature dependency is supplied to an optical receiver, a bit error rate when the optical signal is transduced into an electrical signal likewise exhibits suppressed fluctuations due to temperature, thereby making it possible to realize a stable optical transmission system over a wide range of temperature.

What is claimed is:

1. A method for transmitting an optical signal, said method comprising:
    a) receiving a data signal and supplying a modulation control signal based on said data signal;
    b) generating modulated current at a modulator in accordance with said modulation control signal;
    c) emitting said optical signal in accordance with said modulated current;
    d) detecting operating temperature of said modulator; and
    e) controlling a changing amount per unit time of said modulation control signal based on said operating temperature.

2. An method for transmitting an optical signal according to claim 1, wherein:
said step e) includes controlling an amplitude value of said modulation control signal in accordance with said operation temperature to control the changing amount per unit time of said modulation control signal at rising and falling times.

3. A method for transmitting an optical signal according to claim 1, said method further comprising the step of:
controlling a direct current level of said modulation control signal in accordance with said operation temperature.

4. A method for transmitting an optical signal according to claim 1, said method further comprising:
detecting an operating temperature of a light emitting element, which is driven by said modulated current from said modulator to emit said optical signal in accordance with said modulated current, thereby to output a signal indicative of a detected operating temperature of said light emitting element, and
controlling an amount of driving current supplied to said modulator in accordance with said detected operating temperature of said light emitting element.

5. A method for transmitting an optical signal according to claim 1, said method further comprising:
detecting an operating temperature of a light emitting element, which is driven by said modulated current from said modulator to emit said optical signal in accordance with said modulated current, thereby to output a signal indicative of a detected operating temperature of said light emitting element, and
controlling a current at an output stage of an amplifier, which receives said data signal to supply said modulator with said modulation control signal based on said data signal, in accordance with said detected operating temperature of said light emitting element thereby to control a current of said modulation control signal.

6. A method for transmitting an optical signal optical signal according to claim 1, said method further comprising:
detecting an operating temperature of a light emitting element, which is driven by said modulated current from said modulator to emit said optical signal in accordance with said modulated current, thereby to output a signal indicative of a detected operating temperature of said light emitting element, and
controlling a direct current bias level of said modulated current in accordance with said detected operating temperature of said light emitting element.

7. An optical transmitter comprising:
a modulator for generating a modulated current in accordance with a modulation control signal;
a light emitting element driven by said modulated current from said modulator to emit light in accordance with said modulated current;
a first temperature detector for detecting an operating temperature of said modulator to output a signal indicative of a detected operating temperature of said modulator; and
an amplifier for receiving a data signal to supply said modulator with said modulation control signal based on said data signal;
said amplifier including a first modulation control signal controller for controlling a changing amount per unit time of said modulation control signal at rising and falling times in accordance with the output signal of said first temperature detector.

8. An optical transmitter according to claim 7, wherein:
said first modulation control signal controller controls an amplitude value of said modulation control signal in accordance with the output signal of said first temperature detector to control the changing amount per unit time of said modulation control signal at rising and falling time.

9. An optical transmitter according to claim 7, wherein:
said amplifier includes a second modulation control signal controller for controlling a direct current level of said modulation control signal in accordance with the output signal of said first temperature detector.

10. An optical transmitter according to claim 7, further comprising:
a second temperature detector for detecting an operating temperature of said light emitting element to output a signal indicative of a detected operating temperature of said light emitting element, and
a first current source for supplying said modulator with a driving current;
wherein said first current source controls the amount of driving current supplied to said modulator in accordance with an output signal of said second temperature detector.

11. An optical transmitter according to claim 7, further comprising:
a second temperature detector for detecting an operating temperature of said light emitting element to output a signal indicative of a detected operating temperature of said light emitting element,
wherein said amplifier further includes a further modulation control signal controller for controlling a current at an output stage of said amplifier in accordance with an output signal of said second temperature detector to control a current of said modulation control signal.

12. An optical transmitter according to claim 7, further comprising:
a second temperature detector for detecting an operating temperature of said light emitting element to output a signal indicative of a detected operating temperature of said light emitting element; and
a second current source for supplying said light emitting element with a direct current, said second current source controlling the direct current bias level of said modulated current in accordance with an output signal of said second temperature detector.

* * * * *

UNITED STATES PATENT AND TRADEMARK OFFICE
CERTIFICATE OF CORRECTION

PATENT NO.      : 6,559,995 B2
DATED           : May 6, 2003
INVENTOR(S)     : Shigeru Tokita It is certified that error appears in the above-identified patent and that said Letters Patent is hereby corrected as shown below:

Column 2,
Line 17, change the bottom portion of equation (1) from "$K_B \cdot T$" to -- $k_B \cdot T$ --.

Column 9,
Line 14, change "IQ1(T1)" to -- $I_{Q1(T1)}$ --.

Column 11,
Line 15, change "flip-flop circuit 3" to -- flip-flop circuit 8 --.

Column 13,
Line 39, delete "optical signal".

Signed and Sealed this

Twenty-fifth Day of May, 2004

JON W. DUDAS
*Acting Director of the United States Patent and Trademark Office*